US008088011B2

(12) United States Patent
Russell et al.

(10) Patent No.: US 8,088,011 B2
(45) Date of Patent: Jan. 3, 2012

(54) DYNAMIC DEBUGGING DUMP FOR GAME CONSOLE

(75) Inventors: Zachary Lewis Russell, Bellevue, WA (US); Luke Wilson Timmins, Sammamish, WA (US); Harold Gentry Ryan, Bellevue, WA (US); Stefan Christopher Sinclair, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1137 days.

(21) Appl. No.: 11/268,447

(22) Filed: Nov. 8, 2005

(65) Prior Publication Data
US 2007/0105607 A1    May 10, 2007

(51) Int. Cl.
*G06F 11/00* (2006.01)
(52) U.S. Cl. ............... 463/43; 463/42; 714/45
(58) Field of Classification Search ............. 714/15, 714/43, 33, 37–38, 45; 463/43
See application file for complete search history.

(56) References Cited

U.S. PATENT DOCUMENTS

| | | | | |
|---|---|---|---|---|
| 5,111,384 A * | 5/1992 | Aslanian et al. | ................ | 714/26 |
| 6,067,407 A * | 5/2000 | Wadsworth et al. | ............ | 709/224 |
| 6,298,457 B1 * | 10/2001 | Rachlin et al. | ................ | 714/49 |
| 6,401,216 B1 * | 6/2002 | Meth et al. | ................ | 714/16 |
| 6,430,707 B1 * | 8/2002 | Matthews et al. | ................ | 714/37 |
| 6,629,267 B1 | 9/2003 | Glerum et al. | | |
| 6,769,077 B2 * | 7/2004 | Vachon et al. | .................. | 714/43 |
| 7,178,145 B2 * | 2/2007 | Bono | ............................ | 718/100 |
| 7,191,364 B2 * | 3/2007 | Hudson et al. | .................. | 714/38 |
| 7,240,240 B2 * | 7/2007 | Balakrishnan et al. | ......... | 714/15 |
| 7,322,027 B2 * | 1/2008 | Tousignant | .................... | 717/127 |
| 7,506,318 B1 * | 3/2009 | Lindo et al. | .................... | 717/130 |
| 2002/0069340 A1 * | 6/2002 | Tindal et al. | .................... | 711/203 |
| 2002/0091826 A1 * | 7/2002 | Comeau et al. | ............... | 709/226 |
| 2004/0009815 A1 * | 1/2004 | Zotto et al. | ...................... | 463/42 |
| 2005/0050401 A1 * | 3/2005 | Matsuki et al. | ................. | 714/42 |
| 2006/0059468 A1 * | 3/2006 | Heirich | ......................... | 717/125 |
| 2006/0136877 A1 * | 6/2006 | Gdaniec et al. | ............... | 717/127 |
| 2006/0143534 A1 * | 6/2006 | Dall | .............................. | 714/38 |

OTHER PUBLICATIONS

Van Der Beek, Jelle, "*Monitoring Your Console's Memory Usage, Part One*", http://www.gamasutra.com/features/20040414/vanderbeek_pfv.htm; bearing date of Apr. 14, 2004.

* cited by examiner

*Primary Examiner* — Melba Bumgarner
*Assistant Examiner* — Lawrence Galka
(74) *Attorney, Agent, or Firm* — Lee & Hayes, PLLC

(57) ABSTRACT

An error data dumping process on a game console is described, in which a request for an error data dump may be initiated using commands mapped to a handheld game controller. The request may include parameters for customizing the resulting dump, where the parameters may identify one or more physical memory address ranges to be included in the dump. Allocated virtual memory contents may also be added to the dump data structure, as can call stack data (such as thread lists and module lists) and system information. The assembled dump data can be written to a file and uploaded, via secure communication, to a network location where it may be indexed.

20 Claims, 13 Drawing Sheets

DYNAMIC DEBUGGING DUMP FOR GAME CONSOLE

BACKGROUND

The notion of debugging systems to track down errors has existed as long as (and arguably, even longer than) systems development itself. Indeed, although many credit a Harvard faculty member with coining the term in 1946 to refer to a moth that crashed an early computer by getting trapped in a relay, Thomas Edison had actually used the term in his notebooks, in the 1870s, to refer to mechanical design problems he was experiencing. Today, the term "bug" is commonly used to refer to software errors, or logical errors in a computer program that prevent the program from performing as expected, and the act of "debugging" programs is an often painful and tedious chore.

Debugging a program is often tedious because the developer is usually given very little information to deduce the source of the problem. The developer might simply see that the program "hangs," or enters into a nonresponsive state, with little or no indication as to what is causing the hang. A program intended for calculating a value might simply return the wrong value.

Improvements in technology make the debugging task even more difficult. Computer programs are becoming more and more complex, accomplishing more and more when they work well, but the increased complexity also increases the likelihood for error. Furthermore, general purpose computer systems are often used to coordinate the concurrent execution of a plurality of programs. For example, a personal computer running the "WINDOWS™" operating system (trademark Microsoft Corporation, Redmond, Wash.) might have a word processor program, a spreadsheet program, and an Internet browser program all open at the same time. These independent programs share the computer's resources, and while they might each run just fine if they had the computer all to themselves, they may run into difficulties when they try to coordinate the use of the computer's resources.

Improvements in hardware technology may also complicate matters. For example, many personal computers now rely on virtual memory management systems to artificially increase the amount of RAM (random access memory) space available to the operating system. When a program runs on a system with a virtual memory manager, the program can never be sure of the precise physical areas of memory being used, and this lack of information can make it more difficult for the developer to isolate a bug.

Debugging can be even more difficult on non-general-purpose computers, such as home game consoles. Because game consoles, such as the "XBOX®" and "XBOX 360™" (trademark Microsoft Corporation, Redmond, Wash.), are often optimized for a particular area of use (e.g., home entertainment), they may lack some of the more robust error-checking and debugging capabilities found in other general-purpose computers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Features described herein relate to improved software testing for game consoles. During execution of a game program undergoing testing, a debugging dump trigger command may be initiated. The command may come as a command line entered using a keyboard (which may also be coupled to a test workstation computer), and may alternatively be entered using a handheld game controller. The dump command may allow the requester to customize the data to be included in the dump by specifying a physical address memory range of the game console's memory to be included in the dump.

Other areas of customization are possible as well. The dump trigger may identify files and/or data variables for inclusion, and may also identify additional types of data for exclusion from the ensuing dump. In some aspects, an onscreen prompt may be used to assist the user in entering the parameters for the dump trigger. In some aspects, the dump trigger may be automatically called from within the game code, such as if the execution enters into a known error condition, or if a particular state assertion fails.

When collecting data for the dump, the game console may include data from one or more prior game states. Such prior game state data may help the developer see how an error occurred.

The collected dump data may be uploaded to an Internet server for analysis, and may be indexed for ease of analysis. This uploading may also include compression and security techniques. These and other aspects are discussed in further detail below.

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made.

FIG. 1A illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the features described herein. Neither should the gaming system environment 100 be interpreted as having any dependency or requirement relating to any one or combination of components illustrated in the illustrative operating gaming system environment 100.

Aspects described herein are operational with numerous other general purpose or special purpose computing system environments or configurations. Examples of well known computing systems, environments, and/or configurations that may be suitable for use include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects herein may be described in the general context of computer-executable instructions, such as program modules, being executed by a computer. Generally, program modules include routines, programs, objects, components, data structures, etc. that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

Figure 1:
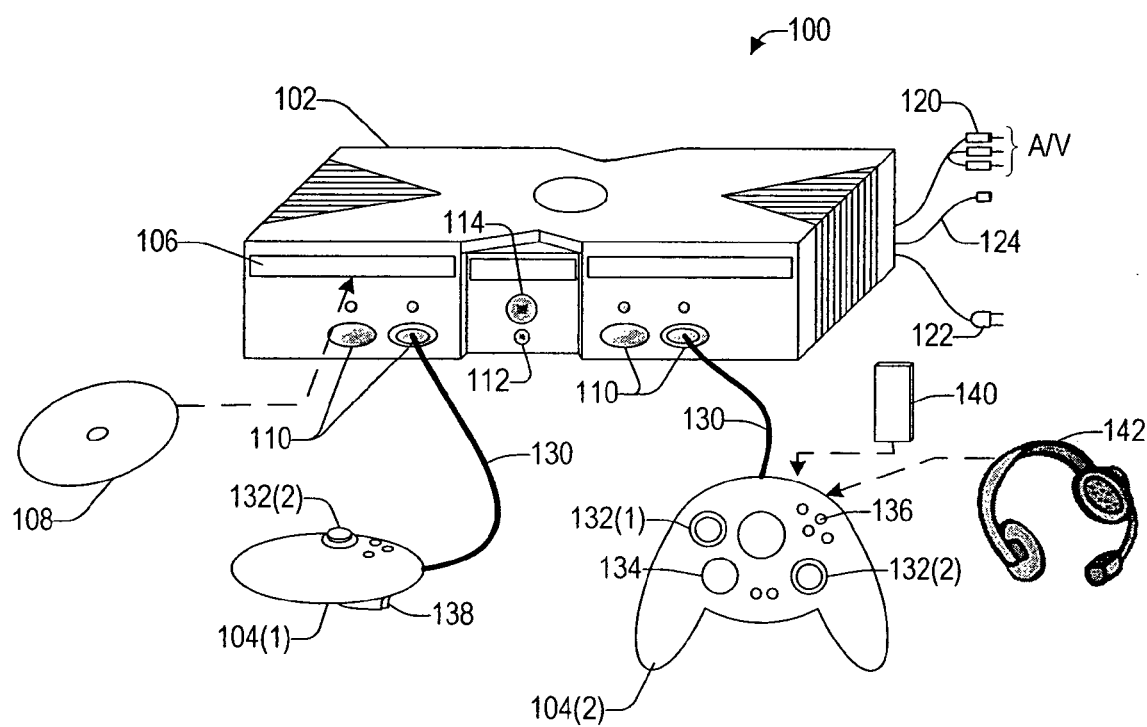
FIG. 1 illustrates a gaming system that may implement one or more of the features described herein.

FIG. 1 shows an exemplary gaming system 100. Gaming system 100 may include a game console 102 and one or more handheld controllers, as represented by controllers 104(1) and 104(2). The game console 102 may be equipped with an internal or external hard disk drive and a portable media drive 106 that supports various forms of portable storage media as represented by optical storage disc 108. Examples of suitable portable storage media include DVD, CD-ROM, game discs, and so forth.

Game console 102 may have a number of slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108. In some aspects, game console 102 may be a dedicated computing device for home entertainment, and may be a closed, secure system that only executes authenticated and authorized applications. The game console 102 may be optimized for executing game programs (e.g., having increased processing support for gaming applications, such as physics co-processors, math co-processors, graphics co-processors, higher resolution video output, higher fidelity audio output, etc.), and may omit certain features commonly found on personal computing devices, such as an alphabetic keyboard, internal hardware expansion slots, printer communication port, etc.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet. Connector 124 may also be fitted with a wireless adapter to connect to one or more wireless networks.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 may be equipped with two thumbsticks 132(1) and 132(2), a D-pad 134, buttons 136 (e.g., 'A', 'B', 'X', 'Y'), and two triggers 138. The thumbsticks 132 may be analog directional control units, and may include analog potentiometers to detect a degree of position in the X- and Y-coordinates. D-pad 134 may be a directional pad, with inputs for entering directional commands such as up, down, left and right, or combinations of these directions (e.g., upper-left). D-pad 134 may also be analog, and may provide input as to a degree of pressure used to press in a particular direction. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., "WINDOWS™" Media Audio (WMA) format), or from online streaming sources; and digital audio/video played from a DVD disc in the portable media drive 106, from a file on the hard disk drive (e.g., Active Streaming Format), or from online streaming sources.

Figure 2:
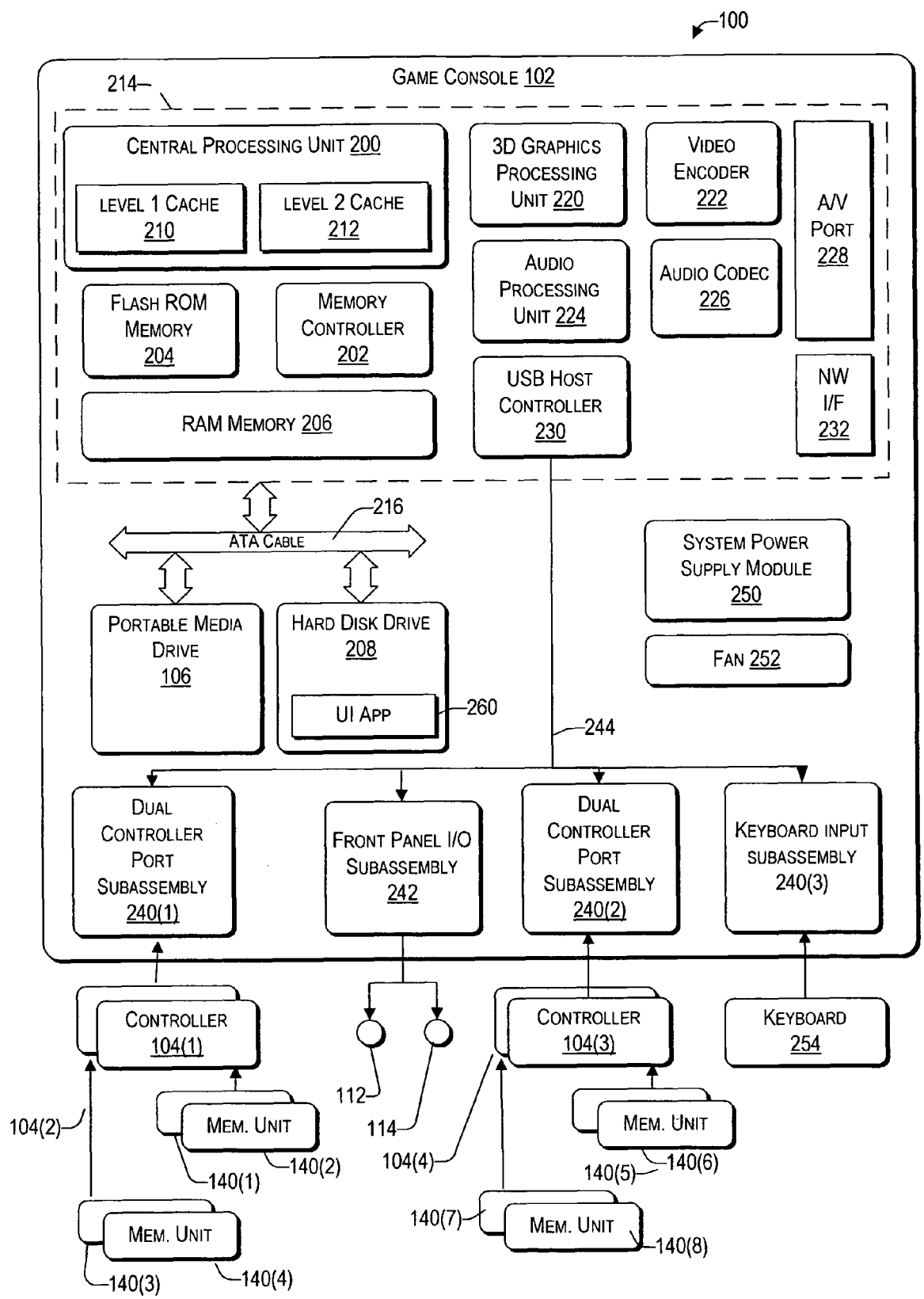
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244. In some embodiments, game console 102 may also include a keyboard input subassembly 240(3), to which is connected a keyboard 254. The keyboard 254 and its subassembly might be offered as part of a developer's kit version of the console 102, to allow the use of a keyboard for entering text commands and data for testing purposes. In some embodiments, the keyboard 254 may communicate directly with a controller port (e.g., as in subassemblies 240), and the use of a separate keyboard input subassembly is not necessary. Furthermore, to conserve further game console resources, a keyboard driver and subassembly may be omitted from the console, and instead the console may be coupled to a second computing device (e.g., another PC, or a debugging workstation) via USB cable, by which the second computing device may send command sequences to the game console, reducing the need in the game console for separate software and/or hardware for interpreting text command sequences entered via the keyboard.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
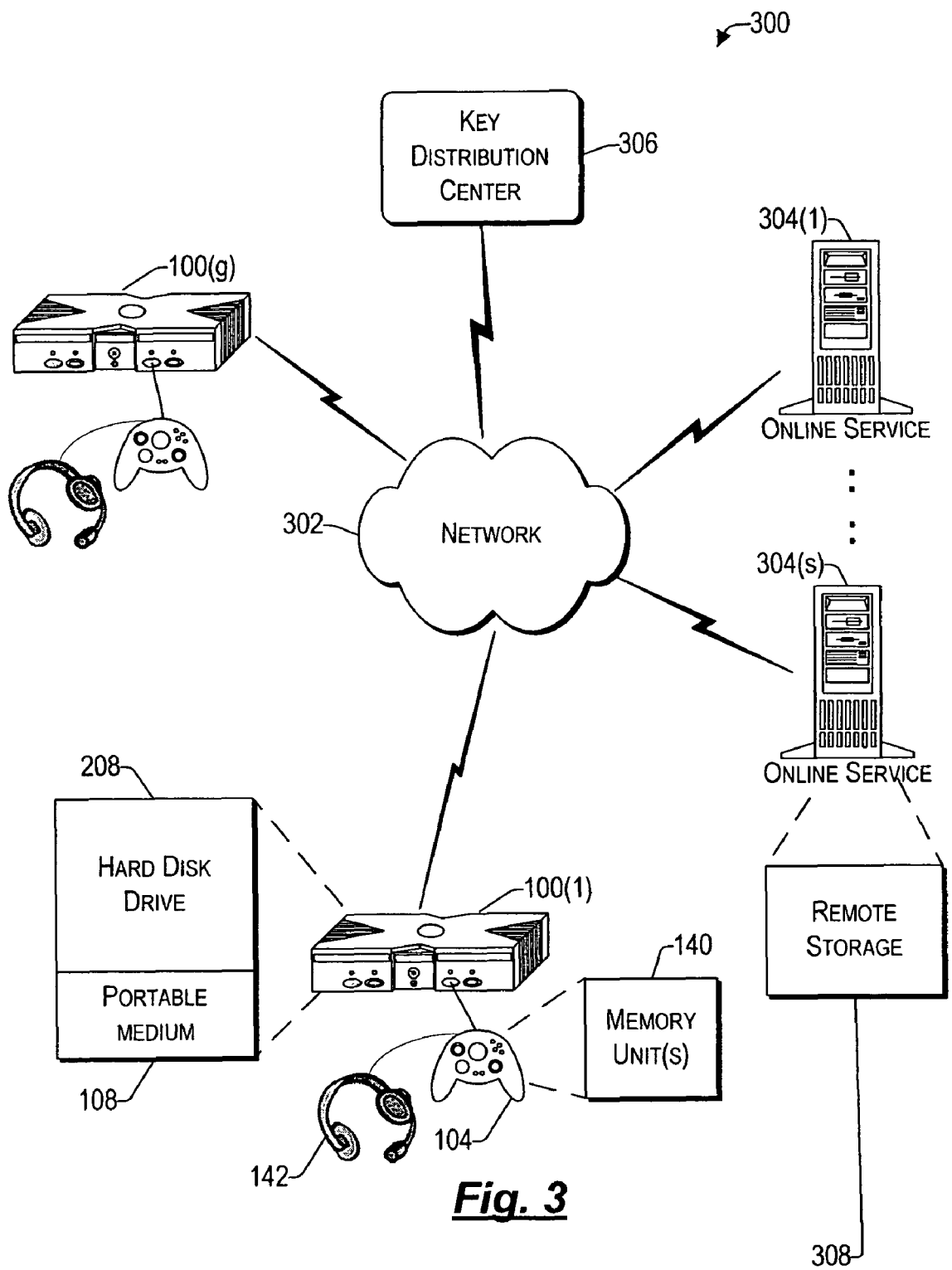
FIG. 3 illustrates a block diagram of a network gaming system that may implement one or more of the features described herein.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
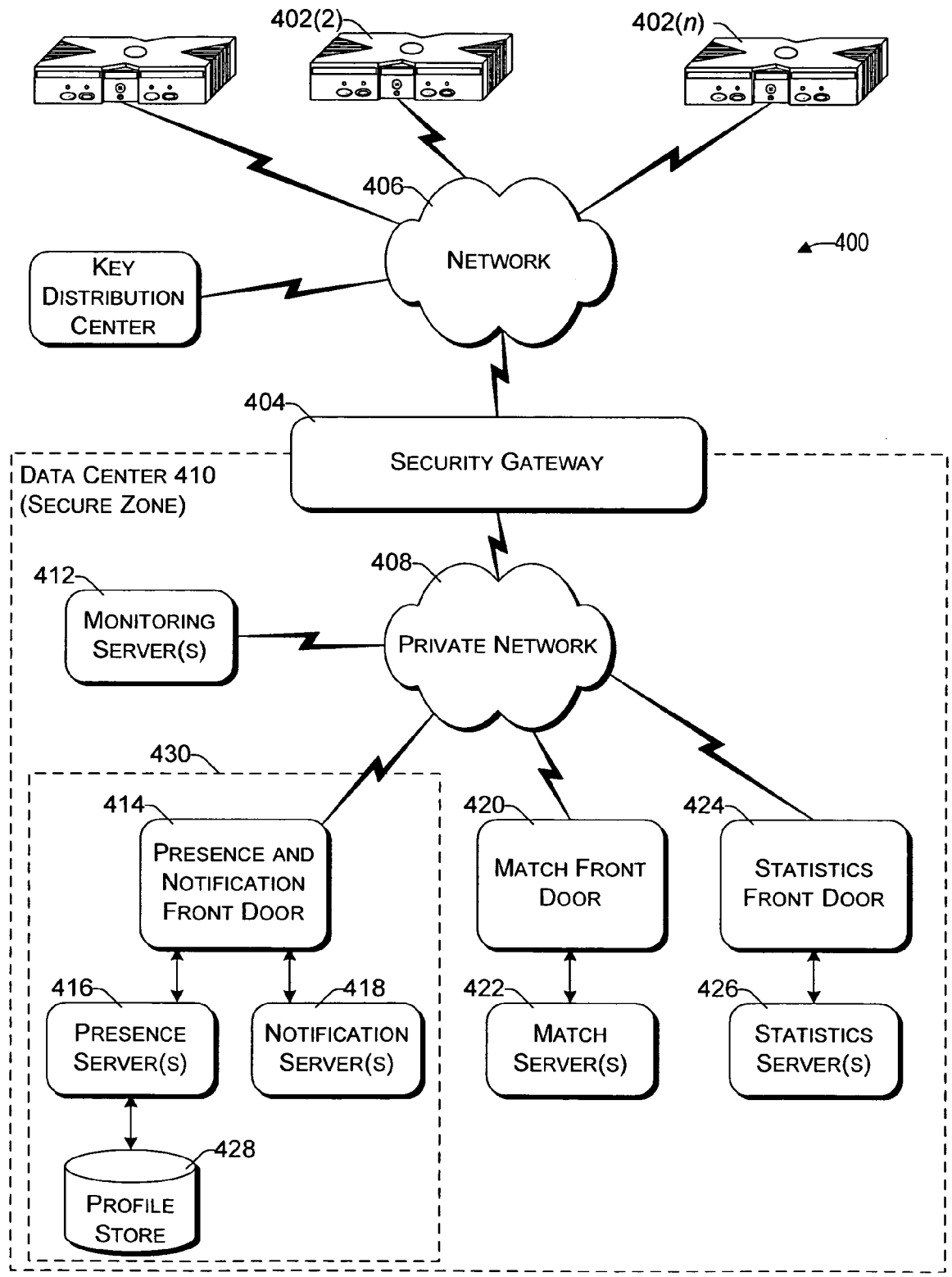
FIG. 4 illustrates another block diagram of an online gaming environment that may implement one or more of the features described herein.

FIG. 4 is a block diagram of another illustrative online gaming environment 400, e.g. "XBOX™ LIVE™" by Microsoft Corporation of Redmond, Wash. Multiple game consoles 402(1), 402(2), . . . , 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more features described herein may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 208, removable storage media 108 (e.g., CD-ROM, DVD, disk, etc.), solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5A:
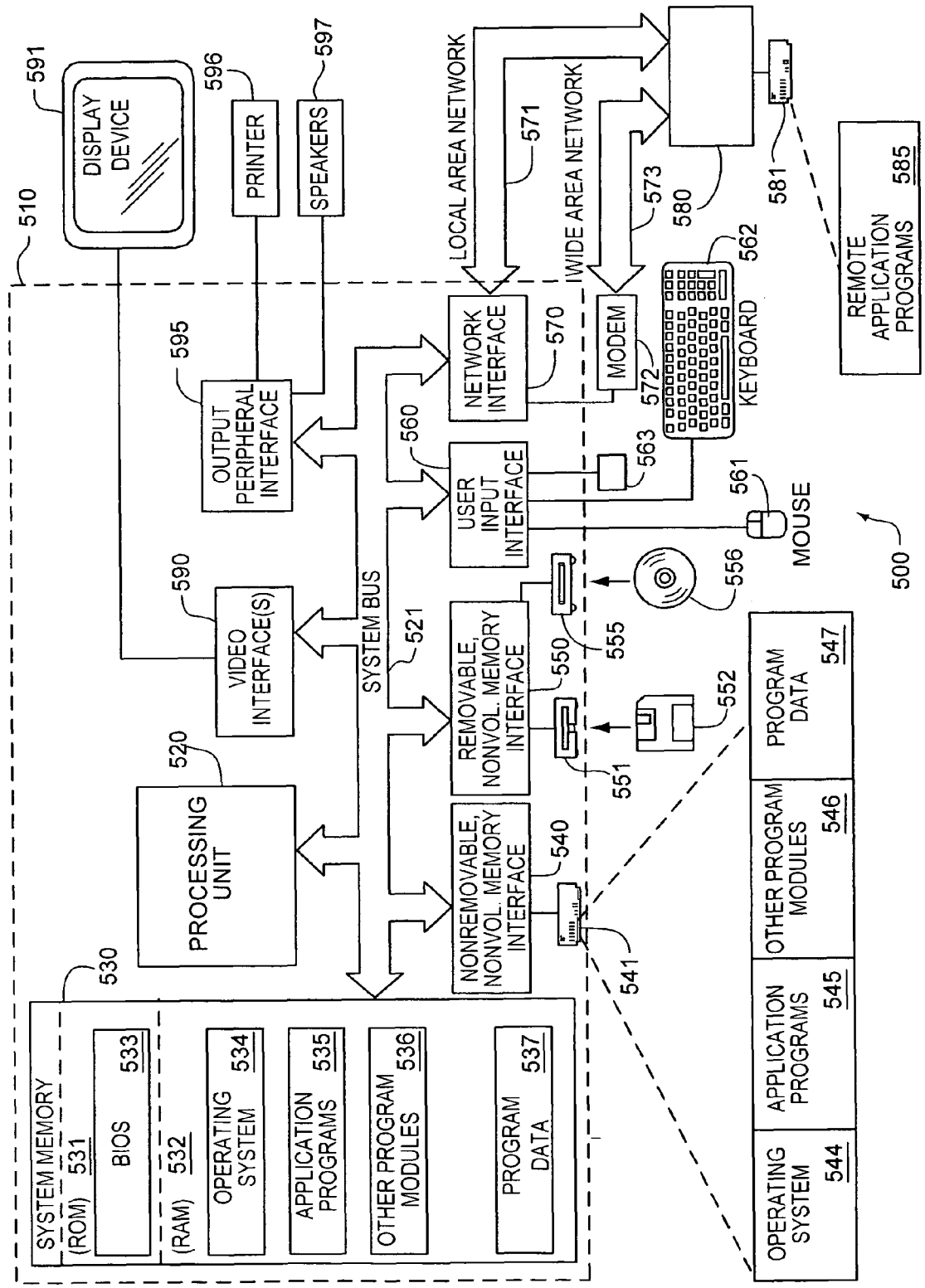
FIGS. 5*a-m* illustrate a block diagram of a general computing system in which one or more features described herein may be implemented and a variety of software component examples.

Aspects herein are not limited to console computing environments. Indeed, these aspects may also be implemented in video games that operate on personal computers (PC). FIG. 5A illustrates an example of a suitable computing system environment 500 on which the features described herein may be implemented. The computing system environment 500 is only one example of a suitable computing environment and is not intended to suggest any limitation as to the scope of use or functionality of the features described herein. Neither should the computing environment 500 be interpreted as having any dependency or requirement relating to any one or combination of components illustrated in the exemplary operating environment 500.

The features herein are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The features herein may be described in the general context of computer-executable instructions, such as program modules, being executed by a computer. Generally, program modules include routines, programs, objects, components, data structures, etc., that perform particular tasks or implement particular abstract data types. The features may also be practiced in distributed computing environments where tasks are performed by remote processing devices that are linked through a communications network. In a distributed computing environment, program modules may be located in both local and remote computer storage media including memory storage devices.

With reference to FIG. 5A, an exemplary system for implementing the features described herein includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices (in the singular or the plural), or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5A illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5A, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 5C:
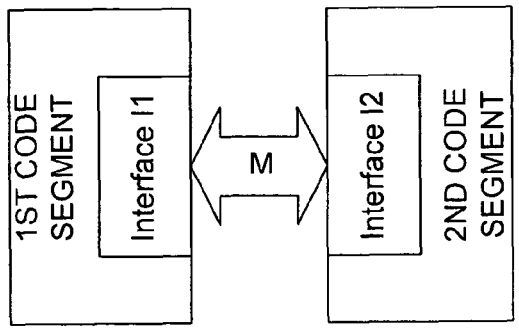
Figure 5E:
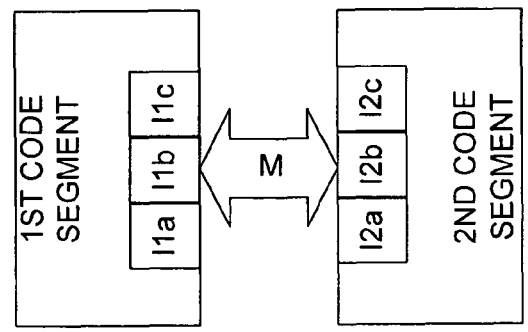
Figure 5B:
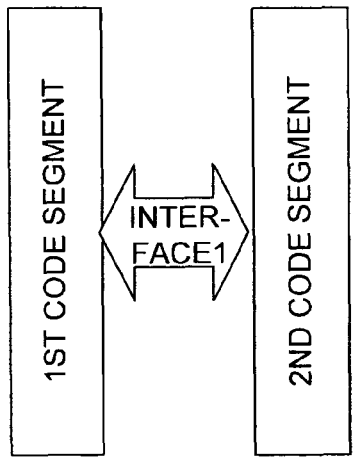

Notionally, a programming interface may be viewed generically, as shown in FIG. 5B or FIG. 5C. FIG. 5B illustrates an interface Interface1 as a conduit through which first and second code segments communicate. FIG. 5C illustrates an interface as comprising interface objects I1 and I2 (which may or may not be part of the first and second code segments), which enable first and second code segments of a system to communicate via medium M. In the view of FIG. 5C, one may consider interface objects I1 and I2 as separate interfaces of the same system and one may also consider that objects I1 and I2 plus medium M comprise the interface. Although FIGS. 5B and 5C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these are intended to be encompassed by the claims set forth at the end of this specification. Such other ways may appear to be more sophisticated or complex than the simplistic view of FIGS. 5B and 5C, but they nonetheless perform a similar function to accomplish the same overall result. We will now briefly describe some illustrative alternative implementations of a programming interface.

A. Factoring

Figure 5D:
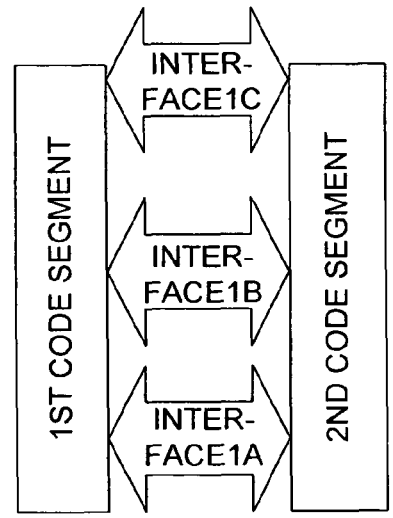

A communication from one code segment to another may be accomplished indirectly by breaking the communication into multiple discrete communications. This is depicted schematically in FIGS. 5D and 5E. As shown, some interfaces can be described in terms of divisible sets of functionality. Thus, the interface functionality of FIGS. 5B and 5C may be factored to achieve the same result, just as one may mathematically provide 24, or 2 times 2 times 3 times 2. Accordingly, as illustrated in FIG. 5D, the function provided by interface Interface1 may be subdivided to convert the communications of the interface into multiple interfaces Interface1A, Interface1B, Interface1C, etc. while achieving the same result. As illustrated in FIG. 5E, the function provided by interface I1 may be subdivided into multiple interfaces I1*a*, I1*b*, I1*c*, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 5D and 5E, the functional spirit of interfaces Interface1 and I1 remain the same as with FIGS. 5B and 5C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 5F:
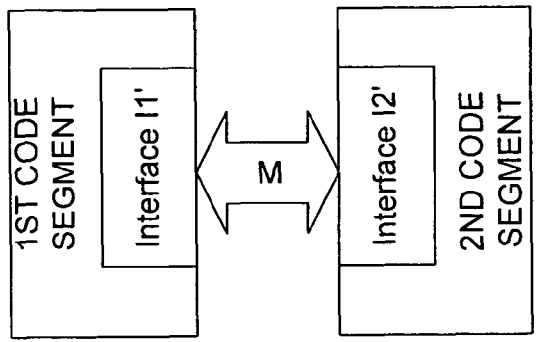
Figure 5G:
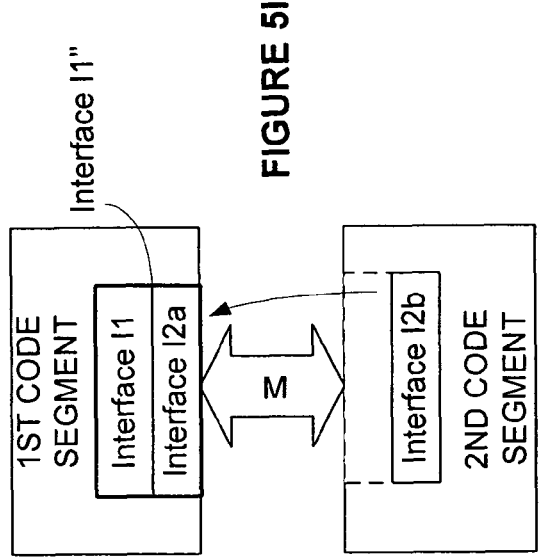

In some cases, it may be possible to ignore, add or redefine certain aspects (e.g., parameters) of a programming interface while still accomplishing the intended result. This is illustrated in FIGS. 5F and 5G. For example, assume interface Interface1 of FIG. 5B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 5F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 5G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 5H:
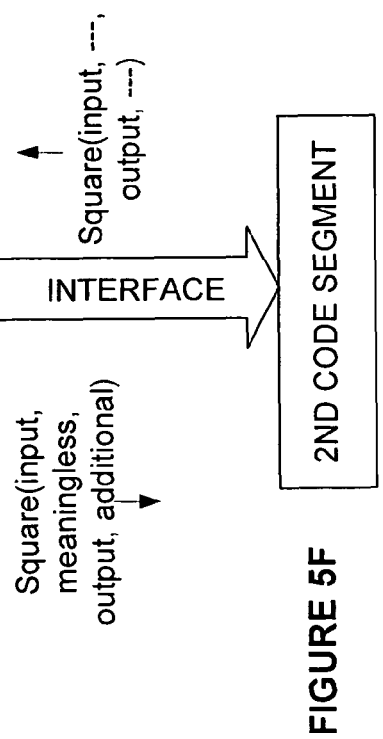
Figure 5I:
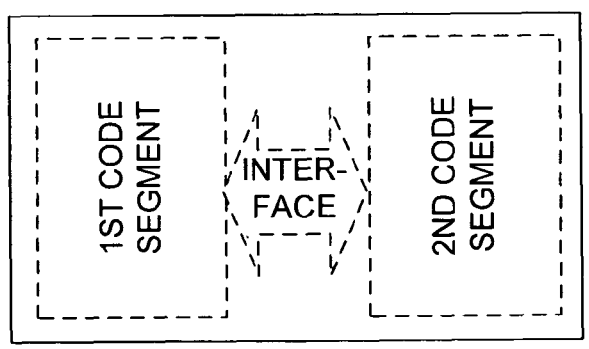

It may also be feasible to merge some or all of the functionality of two separate code modules such that the "interface" between them changes form. For example, the functionality of FIGS. 5B and 5C may be converted to the functionality of FIGS. 5H and 5I, respectively. In FIG. 5H, the previous 1st and 2nd Code Segments of FIG. 5B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface) may still be in effect. Similarly, shown in FIG. 5I, part (or all) of interface I2 from FIG. 5C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 5C performs a function call square (input, output), which is received by interface I2, which after processing the value passed with input (to square it) by the second code segment, passes back the squared result with the output. In such a case, the processing performed by the second code segment (squaring input) can be performed by the first code segment without a call to the interface.

D. Divorce

Figure 5K:
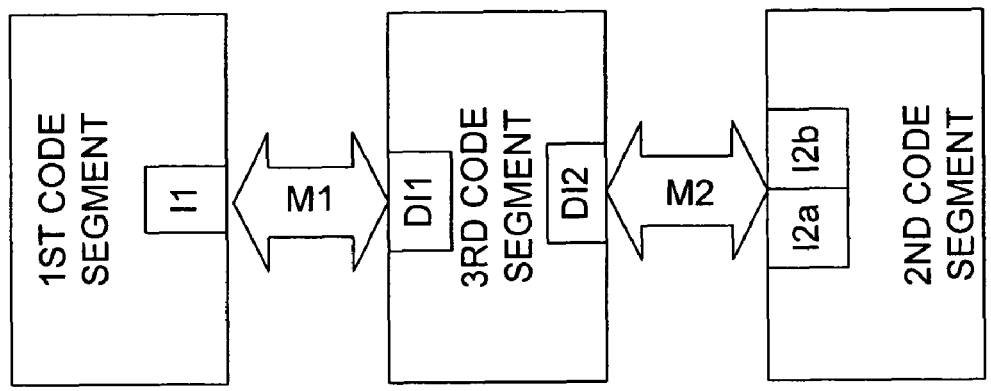
Figure 5J:
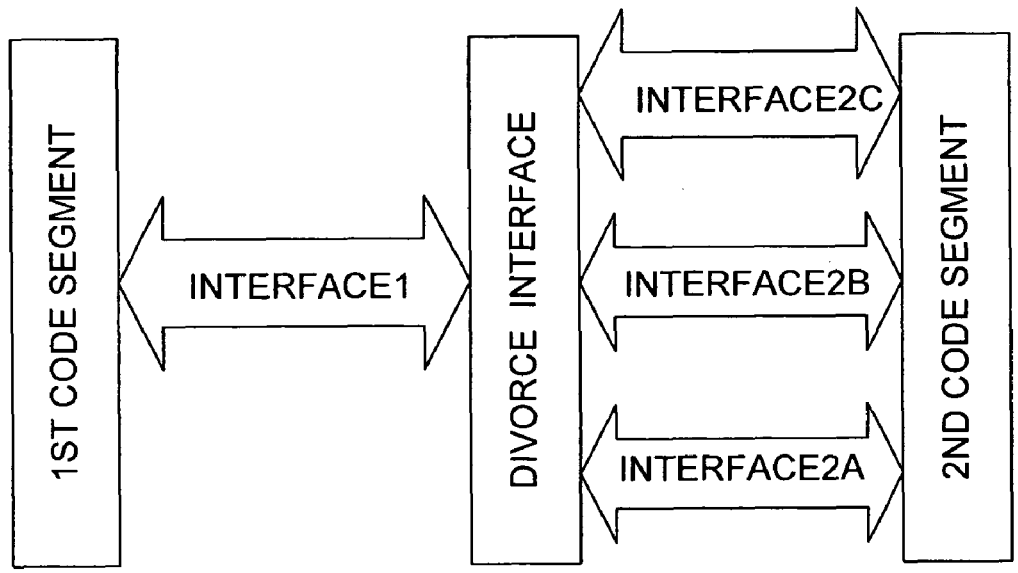

A communication from one code segment to another may be accomplished indirectly by breaking the communication into multiple discrete communications. This is depicted schematically in FIGS. 5J and 5K. As shown in FIG. 5J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 5K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 5C to a new operating system, while providing the same or similar functional result.

E. Rewriting

Figure 5L:
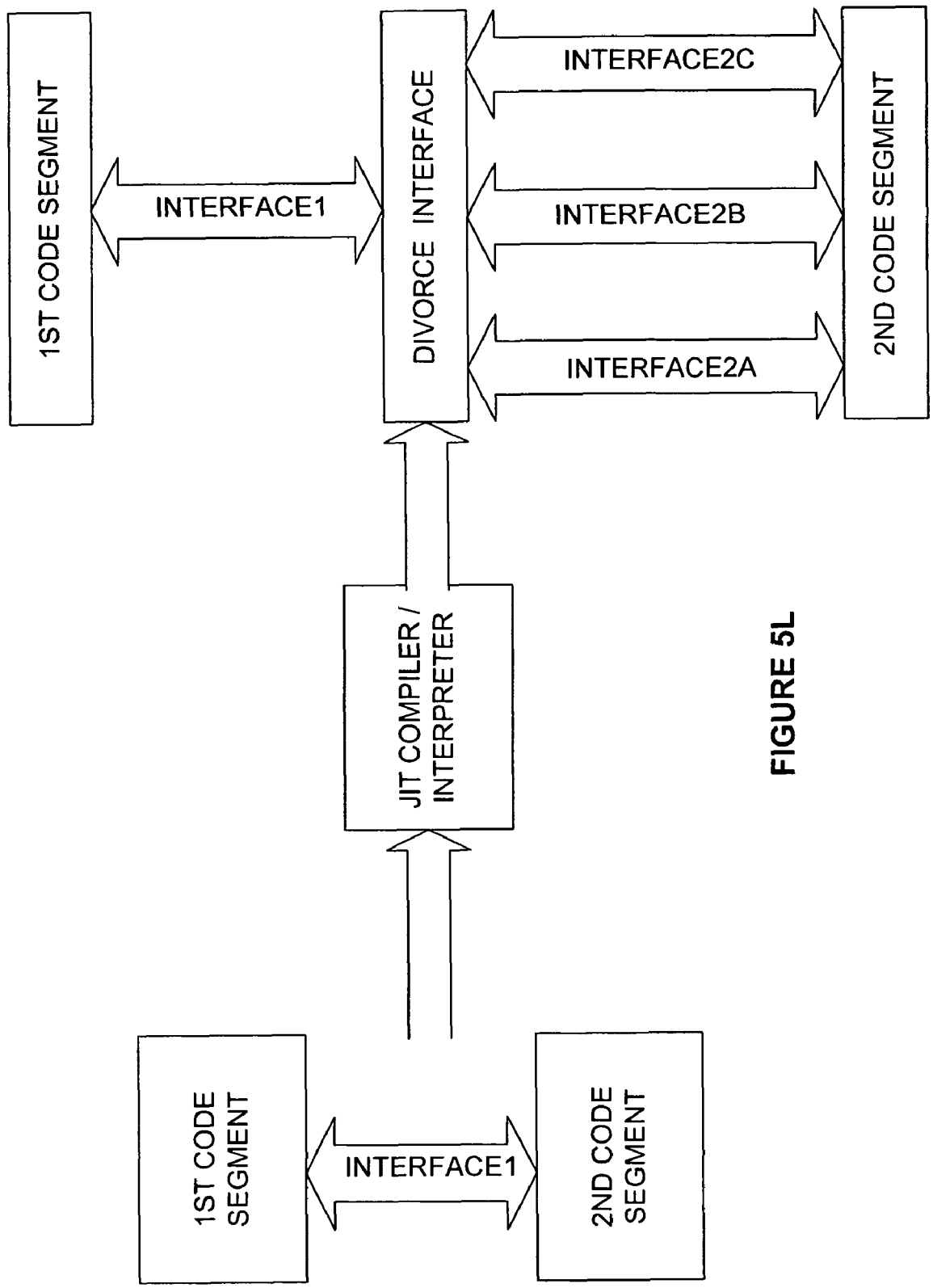
Figure 5M:
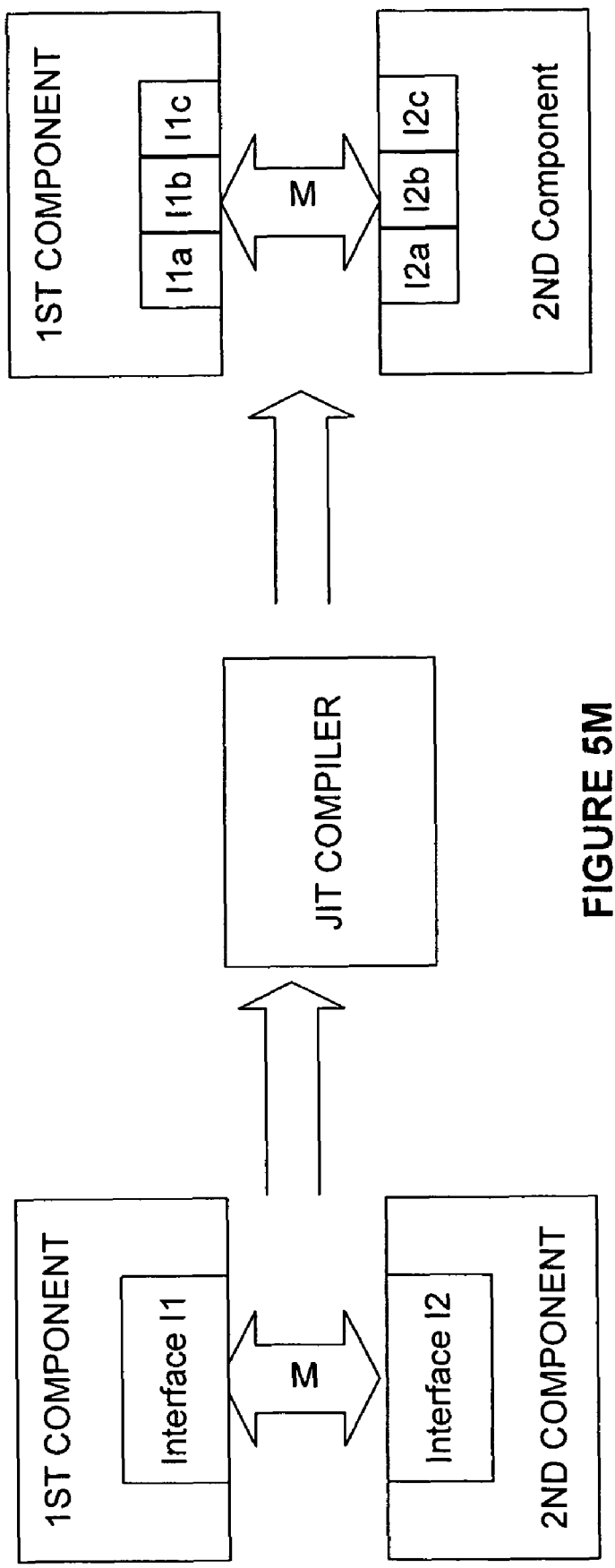

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 5L and 5M. As can be seen in FIG. 5L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 5M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 5B and 5C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface. The aforementioned systems may be used to implement the debugging methods or systems described herein. Various features provide for the automation of providing debugging feedback information to a server by dumping portions of memory and automatically sending the dumped memory to a server when certain debugging events occur.

Figure 6:
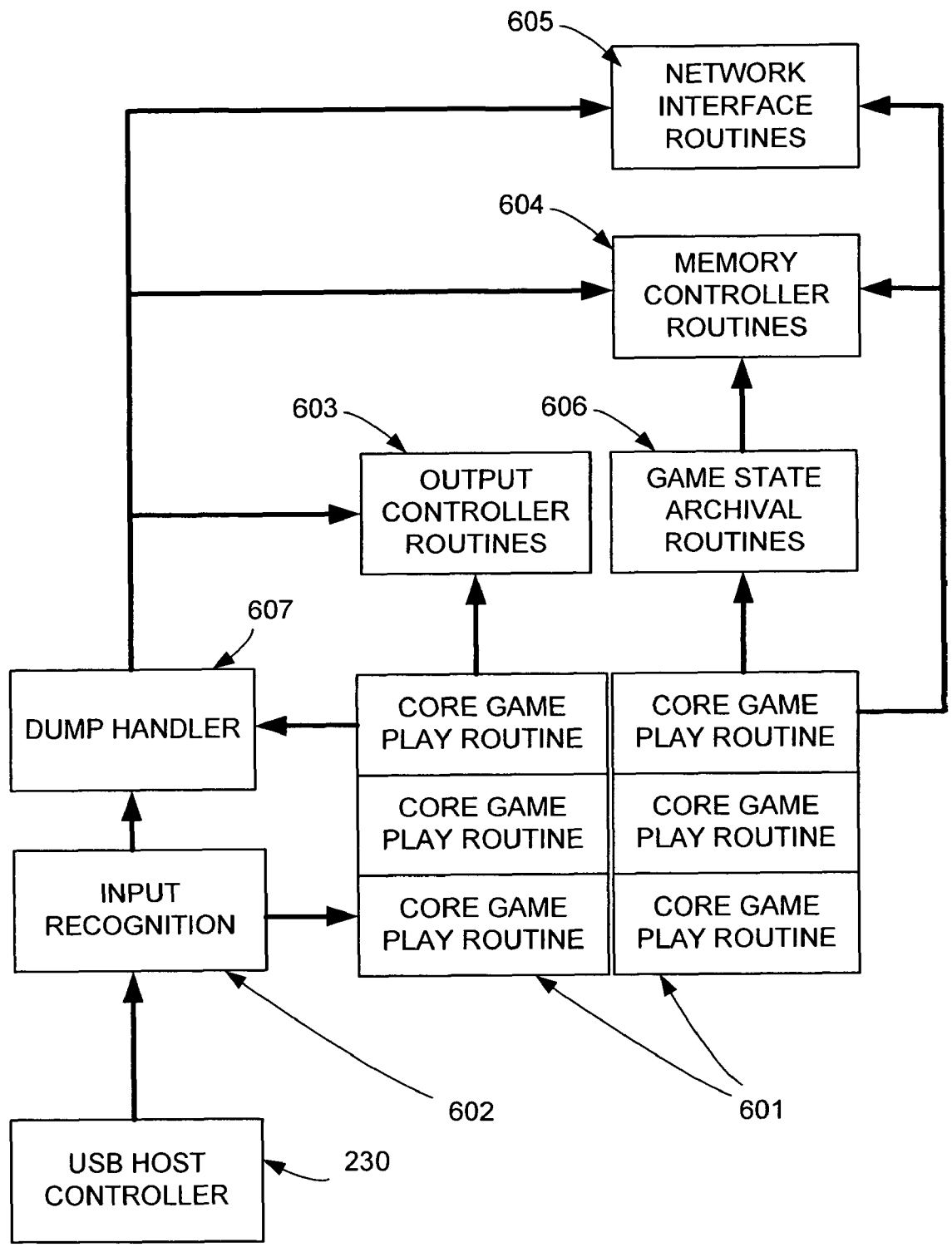
FIG. 6 illustrates some example software routines for software testing on a game console.

FIG. 6 is a conceptual diagram that illustrates a number of software routines that may be implemented on a game console during the development, testing and/or debugging process of creating software for a game console. The various software routines depicted may be provided as part of a game console's operating system, and/or part of a program (such as a game) that is under development.

Core game play routines 601 represent the software code and/or processes that control various central aspects of a game console software program. For example, in a basketball video game, there may be core game play routines for determining the actions of computer-controlled players, monitoring the fatigue level of the various players on the court, updating the basketball game clock, determining what sound effects to load and/or play, and responding to user inputs entered by the player. The game play routines may be executed as part of concurrent threads, such as if the game console supports parallel processing.

The user inputs may be entered via a game controller, such as directional inputs entered using controller 104, and received at USB host controller 230. The host controller 230 may supply these inputs to an input recognition process/routine 602, which may possess knowledge of what inputs are of importance to the particular game in question. For example, if the host controller 230 supports a game controller having left and right analog thumbsticks, but the basketball game being executed has no need for the right thumbstick, the input recognition routine 602 may filter out and/or ignore data from the Host Controller 230 regarding the right thumbstick. Input recognition routine 602 may also interpret the data supplied by the Host Controller 230 to provide a more meaningful input to one or more core game play routines. For example, if a basketball game allows the user to cause a player to either walk or run up the court, depending on whether the analog thumbstick is depressed far enough in a direction, the input recognition routine 602 may receive user input data from the host controller 230 and determine whether the thumbstick has been depressed sufficiently to cause a run, and may simply pass a binary parameter to a core game play routine (indicating "walk" or "run"). Input recognition routine 602 may be included as part of the game program being developed (e.g., as a core game play routine 601), or it may be supplied with the game console operating system (e.g., and called by a core game play routine 601 and/or provided with identifications of the relevant inputs), or it may be omitted altogether (core game play routines 601 may work directly with the host controller 230 to obtain the necessary inputs).

The core game play routines 601 may also call one or more output controller routines 603 to generate output and/or feedback for the user, such as the playing of sound effects, displaying of visual images and/or text, tactile feedback to a controller, etc. For example, if a core game play routine 601 determines that a particular sound is needed, the routine 601 may make a call to one or more output controller routines 603 to cause the sound to be played. Output controller routines 603 may, in turn, control hardware device drivers, video display buffers, etc., as necessary to cause the desired output.

Core game play routines 601 may also call one or more memory controller routines 604 for the storage and/or retrieval of data to/from any of the storage devices available to the game console (e.g., hard disk, RAM, memory card, etc.). This may be used for a variety of purposes, such as the buffering/caching of data retrieved from a game disk, retrieving stored data from a disk, storing a player's save file identifying his/her game progress, storing user-configurable settings in a profile, etc.

Core game play routines 601 may also call one or more network interface routines 605 to communicate over a network to which the game console is connected. This may be done, for example, to download game updates, participate in online gaming sessions, upload data, etc.

Figure 7:
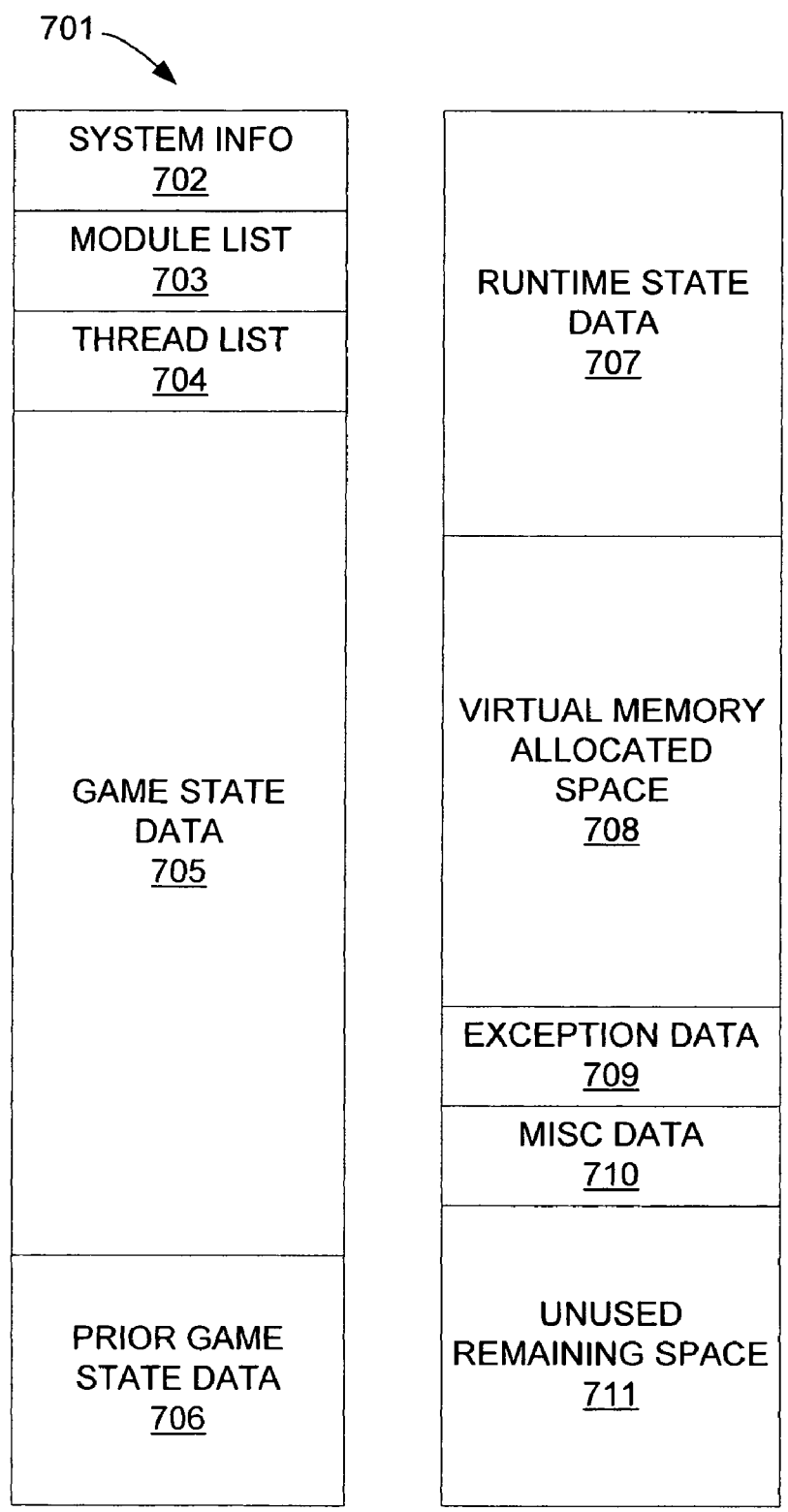
FIG. 7 illustrates example memory contents and data structures for archiving state status in testing software on a game console.

Core game play routines 601 may also call one or more game state archival routines 606. Archival routines 606 may generally be any type of routine or process that preserves data that can be useful for debugging purposes. For example, the archival routines 606 may include a call to a memory controller routine 604 to write data defining a current state of the game, such as the current game time in the basketball game's clock, the current score, which players were in possession of the ball, etc. FIG. 7, discussed further below, illustrates some additional examples of archived game state data.

Core game play routines 601 may also call one or more dump handler routines 607 to cause the game console to perform a debugging dump. The dump handler routine 607 may be provided with one or more parameters that define the specific kinds of data to be included and/or excluded from the resulting data dump, and may also specify the destination of a requested dump. For example, a dump can be requested to cause data to be displayed on a screen via output controller routines 603, written to a memory as one or more files via memory controller routines 604, and/or uploaded to a network destination via network interface routines 605.

Some or all of the depicted routines may be incorporated as part of a game program itself, such as a preliminary build, debugging build, or release build of a game developer's product. Additionally, some of the routines, such as the routines 602-606 may exist separate from the game program, and may be incorporated into the game console itself and/or its operating system.

FIG. 7 illustrates some examples of the kind of data that can be directly or indirectly (e.g., via pointer references) stored in the game console's memory during play (or test), and which may be available for a debugging dump. The memory 701 is depicted as a single block, but it can be found across any of the storage facilities available in the console, such as the processor caches, RAM, hard drive, memory card, etc. The game console may include system information 702, which can include any type of general information regarding the game console system. System information can identify the hardware model, series, components and/or configuration, the time of day, date, build version of the game software being tested, the user running the test, the owner of the test console, etc.

As the game code runs, various routines and subroutines will be executed, and call stack information may be maintained in the console. For example, module list 703 may maintain the calling sequence and parameters of the various modules (e.g., routines, subroutines, etc.) that have been called and/or which make calls. Thread list 704 may identify the individual process threads that are being executed on the system.

As the game progresses, the game routines may store game state data 705 in the console's memory. Game state data 705 may be custom-defined by each game to contain information, such as data variable values and register content, that may be later used to partially or completely recreate the game's current state. For example, a chess game might define a new game state after each player's move, and the game state information might include a list of the moves and/or prior inputs that have occurred in the game thus far. A different type of game may require additional current information regarding the game state. For example, a basketball game might store the current input commands being received, the location of the players on the court and the ball, the player(s) being controlled by the user, the status of the game's artificial intelligence (AI, e.g., if the computer-controlled team is employing a certain strategy, such as a zone defense or full-court press), the current game time (e.g., time remaining in a quarter) and score, etc. Games may define states based on the occurrence of a predetermined event or at irregular intervals, such as a chess player making a move, and/or the passage of a predetermined amount of time or at regular intervals (e.g., storing a new game state periodically, such as once every second).

The game console may also store prior game state data 706 for one or more prior states in the game. As the game play moves from one state to the next, the game program (e.g., in a core game play routine 601) may initiate calls to one or more memory controller routines 604 to cause a desired amount of state information from the previous state to be stored for one or more additional state transitions. For example, the program may cause all (or a subset) of the game state data 705 to be preserved through one state transition in prior game state data 706, so it is available if a dump is needed in the next state. Alternatively, the game may conserve storage and processing resources by reducing the amount of prior state data that is stored, by specifying a subset of the current state's data for storage in future states. A game routine 601 may define or contain a listing of the data variables and/or physical memory address portions that are to be preserved as prior state data, and may also identify a number of subsequent states for which it is to be kept (e.g., keep the contents of buffer X for the next 2 states), and may also identify an address area in memory for keeping that state data. Indeed, different variables and registers may be stored for different periods of time, depending on the type of variable and how quickly it becomes "stale" for debugging purposes. The game state storage calls may include separate indications of duration for different data values and/or address ranges.

Additionally, the game program may also store runtime state data 707. Runtime state data may include data regarding the current status or state of the system, but need not be dependent on the particular game. For example, runtime data may include information identifying the current controller inputs being received by the system, commands that were entered by a keyboard (such as debug commands), game-independent memory contents (e.g., cache memory contents, such as bitmaps), etc.

The various routines and modules may be allocated space in memory by, for example, a virtual memory manager program. This allocated space 708 may be used for a variety of purposes, such as storing temporary data values that will be needed for the game to operate.

The game console may also store exception data 709. For example, if the game console operating system includes an exception handler process, the game may store data identifying registered exceptions, triggered exceptions, exception handling routine identification and status, etc. For example, the operating system may recognize a program hang based on a predefined condition, such as a process returning an error value, or the passage of a predetermined amount of time without a return, and may run a corresponding registered exception handling routine in response.

The depicted memory contents are merely examples, however, and are not exhaustive or limiting. For example, the game console memory may also store other miscellaneous data 710, and may have significant amounts of unused remaining space 711.

Figure 8:
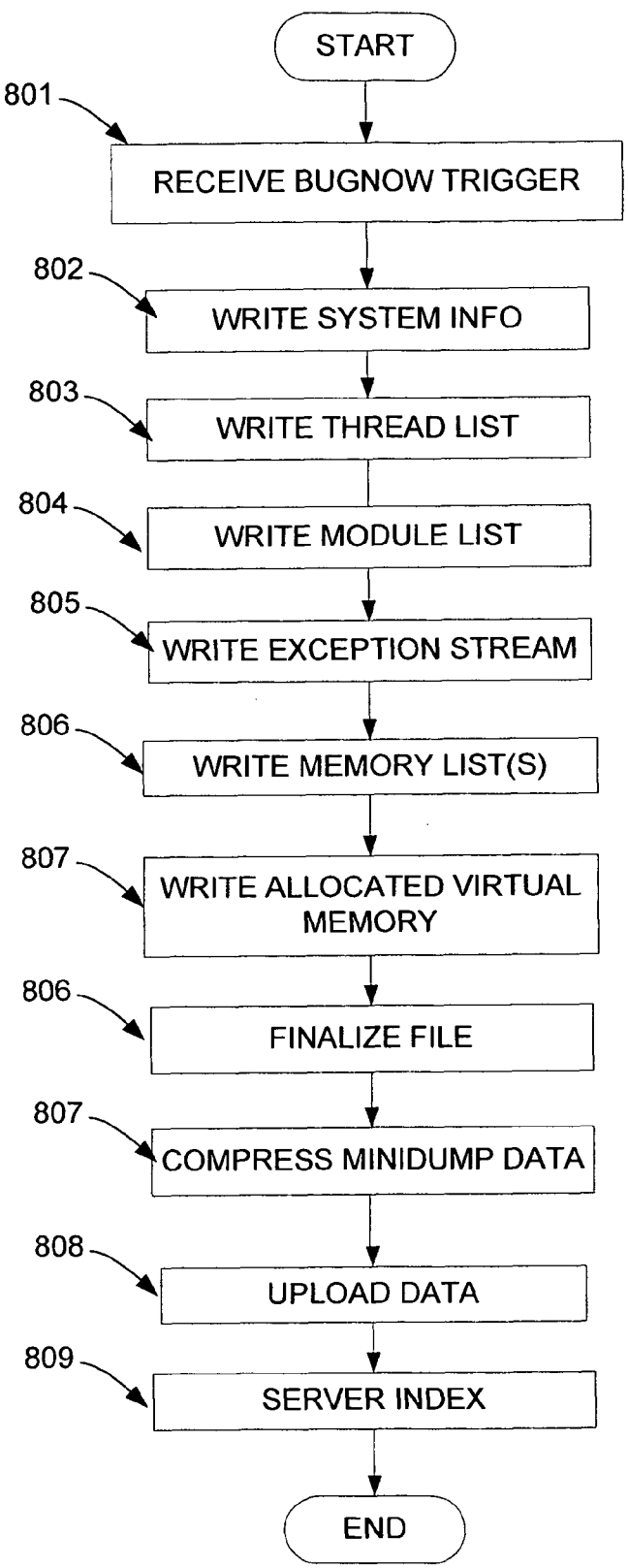
FIG. 8 illustrates an example process of executing and testing software on a game console.

FIG. 8 illustrates an example process in which a dynamic debugging dump may be executed. In step 801, an input may be received that will trigger the dumping process. For example, in embodiments where a keyboard (or a debugging workstation) is attached to the game console, the game developer may initiate a debugging dump by entering a command line instruction, such as "bugnow <parameters>." The command line instruction may include one or more parameters to customize the particular dump. For example, the parameters may include the names of one or more files stored in the game console memory (such as allocated portion 708) to be included in the requested debugging dump. The parameters may include one or more data variables to be included in the dump. The parameters may include one or more handles, or names, used to identify one or more predefined groupings of variables, files, memory locations, etc. So, for example, a developer may define in advance (e.g., in core game routine 601) a number of different handle values that define a group of files and variables, and including the handle in the command line call will include the predefined group to be included in the debugging dump.

Furthermore, the parameters may include one or more physical memory addresses or address ranges to be included in the dump. These addresses can be the actual physical addresses in the hardware, offset physical addresses, or they may simply be virtual addresses if the game console uses a virtual memory manager to handle non-contiguous allocations and such. Since the game developer might already have an idea as to the source of a problem, the developer might be interested in seeing just the value of one particular variable, or the populated values of one specific physical address or address range in allocated memory 705, in the dump. By identifying the specific address(es) in the dump request, the developer may quickly see the most relevant information. For example, the developer may request a dump that contains a specific portion of the game state data 705 by specifying the address (e.g, physical or logical) of the portion of game state data 705 storing that specific data.

The parameters may also identify files, variables, and/or addresses that are to be excluded from a requested debugging dump, in much the same way described herein for including such data in a dump. For example, if the developer wants a particular address range, but knows that certain files or variables are not desired, the developer can enter the command with a parameter identifying the desired range and excluding the data that is to be excluded from the dump.

The dump trigger need not be a command line instruction. As an alternative, a dump command may be mapped to a predetermined sequence of inputs made with a game controller 104. For example, a sequence of commands involving the buttons 132 and trigger 138 (e.g., left trigger+right trigger+start+select+X+Y+A+B buttons) may cause or trigger the debugging dump (crashing the game, if desired). Such a configuration may be particularly useful when the developer is attempting to simulate operation on a production game console in a customer environment, where the customer might only be using a game controller for input (e.g., no testing workstation). This mapping may be done by defining the sequence in the USB host controller 230, input recognition routines 602, or they may be defined in a game play routine 601. The actual definition may take the form of a data list or table.

The dump trigger may be entered dynamically, while the particular game code is running. Additionally, the game code may allow pausing, with an entry of a dump trigger occurring while the game is paused. Furthermore, the game code may use visual and/or audio prompts to the user to guide the user through the process of triggering a dump. For example, a dump option may be displayed on a screen, and a variety of parameters may be displayed for the user's selection. The ability to dynamically request such a dump may be advantageous for catching unanticipated errors, or "soft" errors that are not fatal, such as display errors or errors in non-player character artificial intelligence, or AI. For example, a basketball game might erroneously display the wrong team's mascot at courtside, or one of the computer-controlled players may run out of bounds whenever he/she touches the ball. These kinds of errors are easy to notice in person, but they are difficult to anticipate from a coding perspective, and difficult to account for in advance.

However, for certain errors that can be anticipated (e.g., when a developer includes assertions in the code to test data values during execution, and an assertion fails when a value is not what it is expected to be), a dump may be triggered automatically from within the game program. For example, the game developer may include a "bugnow" command, with any parameters as discussed above, at any location within the game code itself. In this manner, when game play results in execution of a predefined erroneous portion of code, or if the developer includes assertions in the code and an assertion fails, the game console may automatically execute an instruction to trigger a dump. Additionally, if the game console includes an exception handler routine, the game code may register a number of predefined exceptions, such as known possible error states, and may include the "bugnow" dump trigger as part of the exception handling routine for its exceptions. So, for example, an operating system's exception handling may automatically enter a crash state (e.g., a terminal condition in which the game spins idly) upon triggering certain exceptions or failing an assertion. Additionally, or alternatively, a "bugnow" dump trigger may cause the same type of data dump to be prepared and output, but may allow the game program to continue execution as if no error had occurred.

The trigger may also define the information that is to be included in the resulting minidump. This may be done by examining the parameters passed in with the command, or by prompting the user, as discussed above, and may also include consulting predefined data, such as predefined handles for groups of variables or physical address ranges. As an example, this step may include checking the command parameters to identify the actual physical memory addresses (physical addresses may have been passed in as parameters) that are to be included in the dump. In step 801, the console may also check to see what data values and/or addresses are to be excluded from the dump. As with the inclusions, these exclusions may be identified as parameters or from other user inputs (e.g., prompt responses). For example, a video game developer might specifically want to exclude texture maps from the dump, as texture maps are unlikely to change during execution. The trigger might instead include an identification of a texture map that was in use when the error occurred, so that the developer can analyze the texture map that was in use when the dump occurred, without taking up memory space and transmission bandwidth for minidump transmission as described herein.

After a dump trigger is received in step 801, the game console may proceed with assembling the dump or minidump data that is needed. For example, in step 802, the game console may write the system information (e.g., some or all of system information 702) into the minidump file or memory location that will be used to form the minidump file (e.g., a memory stream, array or data structure may be instantiated to store pointers to the data that will be in the dump). In steps 803 and 804, the console may write the contents of thread list 704 and module list 703 into the minidump file (or memory stream, array, or data structure).

In step 805, the console may write an exception stream into the minidump file, containing exception data 709.

In step 806, the console may write one or more memory listings containing raw contents of memory addresses specified in the parameters. These listing can include the contents of any physical address location(s) specified in the request, such as portions of the game state data (current and/or one or more prior state data 705/706) and/or runtime state data (707). The following example application program interface (API) calls can be used to implement these memory listings, where the location and size of the desired address range is obtained and used to obtain the memory listings:

```
minidump_write_memory_list_stream( )
// get game state address and size
game_state_base_address= game_state_get_buffer_address(&game_state_size);
// add game state memory to minidump
minidump_write_memory_block(game_state_base_address, game_state_size,
minidump_information, &custom_memory_blocks[custom_memory_block_index]);
custom_memory_block_index++;
// get runtime state address and size
runtime_state_base_address=
runtime_state_get_buffer_address(&runtime_state_size);
// add runtime state memory to minidump
minidump_write_memory_block(runtime_state_base_address, runtime_state_size,
minidump_information, &custom_memory_blocks[custom_memory_block_index]);
```

```
custom_memory_block_index++;
// add more memory regions
```

In the preceding example pseudocode, a memory block array data structure (e.g., custom_memory_blocks) is used to store the minidump being assembled, and the APIs pass pointers to the array location for the data to be added, with 'custom_memory_block_index' representing positions in the array. The parameter 'minidump_information' may be used to identify characteristic information of a minidump, such as a file handle for the minidump, the size capacity, etc. The 'game_state_base_address' parameter may identify a starting physical memory address location, and the 'game_state_size' may identify a size of the physical memory address range that is to be added to the dump. Similarly, the 'runtime_state_base_address' and 'runtime_state_size' parameters may identify an address range to include the runtime state data. The address range could be provided alternatively, such as with a starting and ending address, an ending address and size, an address and one or more offsets, etc. In addition to the game state and runtime state address ranges, the developer can include any number of other memory regions by identifying the desired physical address ranges.

In step 807, the allocated virtual memory contents may be added to the minidump. For example, the game console may simply walk through the various memory locations (e.g., pages, blocks, etc.) and include those locations that are in use. The following example pseudocode may be used to perform this step:

```
minidump_write_virtual_memory_stream( )
while (virtual_address <= k_max_virtual_address)
{
    VirtualQuery((void *)virtual_address, &memory_information,
    sizeof(memory_information));
    if (memory_information.State == MEM_COMMIT)
    {
        unsigned long next_address= (unsigned
long)advance_void_pointer(memory_information.BaseAddress,
memory_information.RegionSize);
        if ((next_address > virtual_address) &&
            (next_address <= k_max_virtual_address))
        {
            minidump_stream.write_memory_block_to_stream(
                (void *)virtual_address,
                memory_information.RegionSize);
            virtual_address= next_address;
        }
    }
    else
    {
        virtual_address+= k_page_size;
    }
}
```

In the preceding example, 'virtual_address' and 'k_max_virtual_address' are integer values used to create a loop to step through the various memory locations, and at each location, a test is made to determine whether that memory location (or a portion of it) has been allocated or committed, and if it has, then the address for that location is added to the range of addresses that will be used in the memory listing. Each memory region added to the minidump file (or stream, array, etc.) may be preceded in the minidump by header information identifying the size and address location of the region. The 'memory_information' data structure includes a state value, which can be a flag to identify whether a particular area in memory is committed, a 'BaseAddress' value to identify a starting physical memory address location for a region, and a 'RegionSize' value to identify the physical memory size of the region. The 'next_address' value may identify the next memory location to check, and may be incremented either by a default value for uncommitted memory ('k_page_size') or by the memory region size for a committed region of memory. This approach can be used to obtain contents of virtual memory regions that are of a customized size.

Through this process, contents of virtual memory regions may be added to a data stream, which may be written to a file to form a minidump file. In some situations, the virtual memory regions are all first written to an intermediate data structure, such as an array or data stream, and then when the system has added all the necessary virtual memory regions to the data structure, the system writes the data to an intermediate file, such as a virtual memory stream file (which may exist apart from the minidump file). The contents of this file may then be added, or injected, to the minidump file after the other data (e.g., crash files such as the data described above, screen dumps, crash logs, etc.) have been written to the minidump file. By using this intermediate data structure, the system can reduce hard disk I/O times, and lead to faster minidumps. This arrangement may be faster because a disk access may be needed for each memory region added to a file, and by consolidating the disk accesses some efficiencies may be realized.

In step 806, the minidump file may be finalized. Finalization may include copying the minidump's memory stream, array, or other data structure to a file format for transmission, and performing file organization tasks, such as creating a directory and header information for the file to be transported.

In step 807, the dump data may be compressed using a lossless data compression algorithm, and in step 808, the compressed dump data may be uploaded to a destination. The upload may result in storing the data on the console's memory, storing it on a memory of a test workstation coupled to the console, or uploading it to a network destination, such as an Internet site. If uploading to a network destination, the console may upload the file using secure transmission techniques, such as encryption encoding to help keep the data secure. the file creation and/or uploading may also allow the developer to offer a custom name for the resulting file.

Once the data is uploaded, it may then be analyzed by the developer to isolate a source of a bug. If uploaded onto a network, such as an Internet site, the game developer may use web interface tools to view and analyze the dump's data. In step 809, if the data is uploaded onto a network, a network resource (such as a server) may catalog and/or index the dump data for future reference. For example, the dump data may be indexed by time/date, or by the identity of the individual submitting the dump. A unique index, such as a session ID, may be created each time a game is launched, and all data dumped from that session may be associate with this session ID (e.g., file names for separate dumps may include a session ID, dump data may be placed in an electronic folder bearing the session ID, etc.).

The various steps shown in FIG. 8 may be implemented using pseudocode such as the following:

```
long minidump_from_exception(
  filename,
  exception_code,
  exception_information)
{
  minidump_write_virtual_memory_stream(memory_stream_file_name);
  minidump_write_header(&minidump_information);
  minidump_write_stream_directory(&minidump_information);
  minidump_write_system_info_stream(&minidump_information);
  minidump_information.current_stream_index++;
  minidump_write_thread_list_stream(&minidump_information)
  minidump_information.current_stream_index++;
  minidump_write_module_list_stream(&minidump_information);
  minidump_information.current_stream_index++;
  minidump_write_exception_stream(&minidump_information);
  minidump_information.current_stream_index++;
  minidump_write_misc_info_stream(&minidump_information);
  minidump_information.current_stream_index++;
  minidump_write_memory_list_stream(&minidump_information);
  minidump_information.current_stream_index++;
  minidump_write_unused_stream(&minidump_information);
  minidump_information.current_stream_index++;
  minidump_write_unused_stream(&minidump_information);
  minidump_information.current_stream_index++;
  minidump_write_stream_directory(&minidump_information);
  minidump_finalize_file(&minidump_information);
}
```

The 'filename' value is a handle identifying the name of the minidump file, while 'exception_code' and 'exception_information' are parameters that may be used by an exception handler to identify the type of exception that triggered the dump.

The 'minidump_write_virtual_memory_stream' routine receives the name of the memory stream file, and may be used to instantiate the file that will be used to store the virtual memory stream.

The 'minidump_write_header' routine receives a pointer to the minidump_information data structure, and is used to add header information for the minidump file. The header information can identify characteristics of the file, such as size, and may be added directly to the file or may be added to an intermediate data structure (e.g., a data stream, array, etc.) for subsequent adding to a file.

The 'minidump_write_stream_directory' routine may add a directory to the minidump file so that it's contents may be easily retrieved. The remaining routines may be used to write the data as indicated in their names. The 'minidump_write_unused_stream' routine may be used to write one or more unused data streams to the minidump file, and may serve as placeholders should the system need to inject additional data into the minidump (e.g., if the system wishes to edit the file without changing its characteristics, such as its size or location, the system can simply replace some or all of the unused streams in the minidump file. In some cases, writing multiple unused streams to the minidump file, to create additional available space for such future expansion, may be desirable.

In the preceding example, the minidump may be a memory array data structure indexed by an integer value 'minidump_information.current_stream_index,' and the overall process may be provided with parameter data identifying the minidump file name and the libraries and/or locations of the various routines to be called. Additionally, the various routines may be used to combine multiple existing memory I/O streams into a single stream, simplifying and streamlining the system.

The features described above are preferably encoded in computer software as executable instructions that can be executed on a computing device, such as a personal computer or video game console, to result in the display of the screens shown in the figures. The executable instructions may be stored on a computer-readable medium, such as one or more computer disks, RAMs, CD-ROMs, DVDs, game cartridges, etc. Also, although various features are described above, it is not necessary to practice them all in the same embodiment. Instead, various combinations and subcombinations may be implemented as desired, and the true scope of the present invention should only be limited by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. A computer program testing method, comprising:
launching a game program for testing on a game console, the game console being a dedicated computing device configured for home entertainment, wherein the game console omits a printer communication port and the game console omits an internal hardware expansion slot;
responsive to the launching, the game console creating a unique session identifier (ID) for the game program;
executing the game program on the game console, the executing game program being associated with the unique session ID;
detecting an error in the game program that is executing;
responsive to detecting the error in the game program that is executing, receiving, from a device connected to the game console, an indication to activate a debugging dump trigger command, wherein the debugging dump trigger command includes an identification of a physical game console memory address range whose data is to be included in a requested data dump and a requested dump destination;
in response to receipt of the debugging dump trigger command:
collecting data from the physical game console memory address range; and transmitting the collected data to the requested dump destination; and indexing the collected data at the dump destination, wherein the indexing is based at least on the unique session ID with which the collected data are associated.

2. The computer program testing method of claim 1, wherein the debugging dump trigger command results in execution of an instruction within the game program executing on the game console.

3. The computer program testing method of claim 1, wherein the game program automatically sends a minidump of information as defined by the debugging dump trigger command to a server.

4. The computer program testing method of claim 3, wherein the debugging dump trigger command is activated automatically by the game program using an exception handler.

5. The computer program testing method of claim 1, wherein said transmitted data includes:

game program build version information; and information identifying a user using said game console.

6. The computer program testing method of claim 1, further comprising receiving an indication of data that is to be excluded from the requested dump, wherein the indication of data that is to be excluded from said requested dump includes parameters identifying files, variables and one or more addresses that are to be excluded from the requested data dump.

7. The computer program testing method of claim 1, wherein the dump destination comprises an Internet server.

8. The computer program testing method of claim 7, wherein the transmitting employs encrypted transmission, and wherein the collected data is compressed before transmission.

9. The computer program testing method of claim 1, wherein the debugging dump trigger command is received during a first game state, and the transmitting further includes transmitting game state data for at least one game state occurring prior to the first game state.

10. The computer program testing method of claim 1, wherein the transmitted data includes game console hardware identification information.

11. The computer program testing method of claim 1, wherein the requested dump destination includes at least one destination and the data dump is performed by a routine corresponding to a respective destination;

the respective destination including one of:

an on-screen destination, wherein the dump causes data to be displayed on a screen by an output controller routine;

a memory destination, wherein the dump causes data to be written to a memory as one or more files by a memory controller routine; or a network destination, wherein the dump causes data to be uploaded to a network destination by a network interface routine.

12. The computer program testing method of claim 11, wherein the routine is incorporated in the game console separate from the game program.

13. The computer program testing method of claim 11, wherein the routine is incorporated in the game program.

14. The computer program testing method of claim 1, the device connected to the game console including a game controller, and the debugging dump trigger command including a predetermined sequence of inputs made with the game controller.

15. One or more computer-readable storage media excluding signals per se, the computer-readable storage media storing computer-executable instructions that, upon execution cause a game console to perform a test of a game program by performing operations comprising:

launching the game program to test on the game console, the game console being a dedicated computing device configured for home entertainment, wherein the game console omits a printer communication port and the game console omits an internal hardware expansion slot;

responsive to the launching, the game console creating a unique session ID for the game program;

executing the game program on the game console, the executing game program being associated with the unique session ID;

detecting an error in the game program that is executing;

responsive to detecting the error in the game program that is executing, receiving a debugging dump trigger command, wherein the debugging dump trigger command includes an identification of a physical game console memory address range whose data is to be included in a requested data dump and a requested dump destination;

in response to receipt of the debugging dump trigger command;

collecting data from the physical address range; and transmitting the collected data to the requested dump destination for indexing based at least on the unique session ID with which the collected data are associated.

16. The one or more computer-readable storage media excluding signals per se as recited in claim 15, wherein the authenticated dedicated computing device for home entertainment is authenticated to form games amongst multiple players or to purchase services from online services via a distributed service ticket.

17. A game testing system comprising:

a game controller; and a game console, the game console being a dedicated computing device configured for home entertainment, wherein the game console omits a printer communication port and the game console omits an internal hardware expansion slot, the game console configured to perform game test operations comprising:

launching a test of a game program on the game console;

responsive to the launching, the game console creating a unique session ID for the test of the game program;

associating the unique session ID with the test of the game program;

executing the game program on the game console, the executing game program being associated with the unique session ID;

detecting an error in the game program that is executing;

responsive to detecting the error in the game program that is executing, receiving an indication to activate a debugging dump trigger command that includes an identification of a physical game console memory address range whose data is to be included in a requested data dump and a requested dump destination;

in response to receipt of the debugging dump trigger command:

collecting data from the physical game console memory address range; and transmitting the collected data to the requested dump destination; and indexing the collected data at the dump destination according to the unique session ID with which the collected data are associated.

18. The game testing system of claim 17, the game test operations further comprising:
responsive to detecting the error in the game program that is executing:
identifying an error condition in a first process of the game program that is executing on the game console;
issuing, from the first process as part of the debugging dump trigger command, a first call to a physical memory list error data dumping process, said first call including:
a first parameter identifying the physical game console memory address range,
a second parameter identifying an error data dump structure, and
a third parameter identifying a location in said error data dump structure, the location based at least on the unique session ID; and
the physical memory list error data dumping process retrieving memory contents from the physical game console memory address range, and adding the retrieved memory contents to the error data dump structure at the identified location.

19. The of gaming testing system claim 18, the game test operations further comprising at least one of:
issuing, from the first process, a second call to the physical memory list error data dumping process to add contents of a second physical game console memory address range to the error data dump structure; or
issuing a call to a virtual memory error data dumping process, the virtual memory error data dumping process sequentially checking portions of a memory for whether the portions are allocated, and adding the allocated portions to the error data dump structure.

20. The game testing system of claim 18, wherein the third parameter identifying the location in the error data dump structure comprises passing a pointer to the location for adding the memory contents.

* * * * *